J. PEARD.

School Settee and Desk.

No. 6,536. Reissued July 6, 1875.

*Witnesses:*
Chas Kahlen
Otto Hufeland

*Inventor.*
John Peard
per
Van Santvoord & Hauff
Attys

N. PETERS, PHOTO-LITHOGRAPHER, WASHINGTON, D. C.

UNITED STATES PATENT OFFICE.

JOHN PEARD, OF BROOKLYN, NEW YORK.

IMPROVEMENT IN SCHOOL SETTEES AND DESKS.

Specification forming part of Letters Patent No. 66,384, dated July 2, 1867; reissue No 6,536, dated July 6, 1875; application filed April 23, 1875.

*To all whom it may concern:*

Be it known that I, JOHN PEARD, of Brooklyn, in the county of Kings and State of New York, have invented a certain new and Improved School Settee and Desk, of which the following is a specification:

This invention is illustrated in the accompanying drawing, in which—

Figure 1:
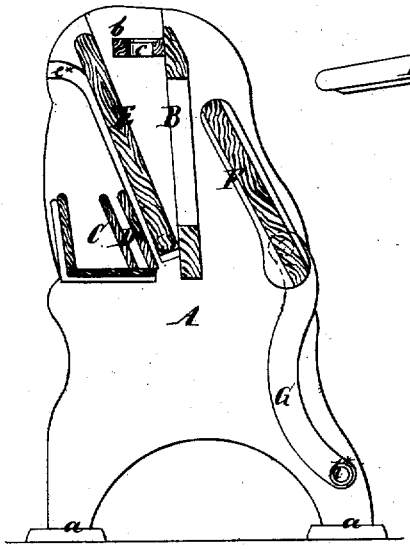
Figure 2:
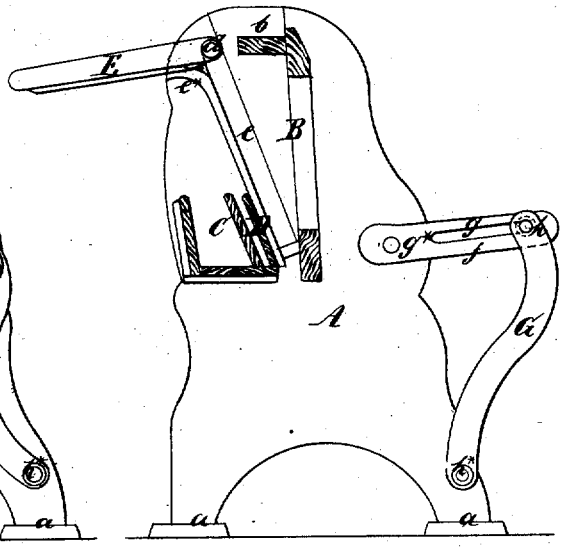
Figure 3:
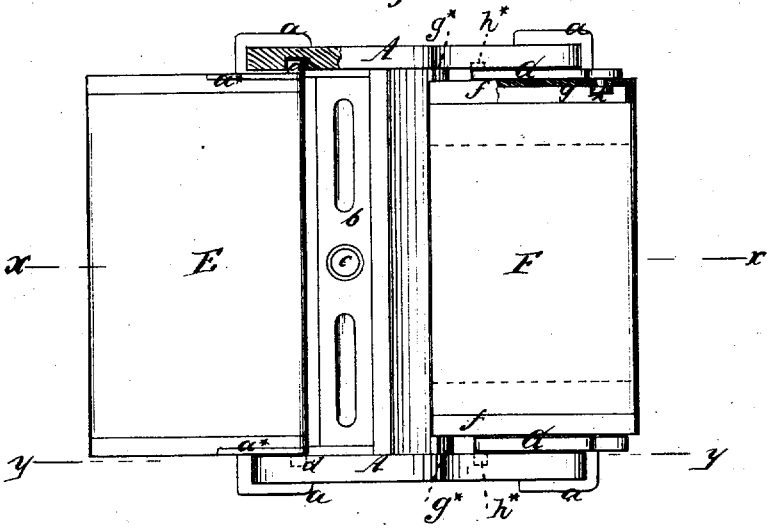

Figure 1 represents a transverse vertical section when the seat and desk are folded, the line *x x*, Fig. 3, indicating the plane of section. Fig. 2 is a similar section of the same in an unfolded state, the line *y y*, Fig. 3, indicating the plane of section. Fig. 3 is a plan or top view of the same.

Similar letters indicate corresponding parts.

This invention relates to a new and improved combination of a school settee and desk, the desk being so arranged that the same, by raising its outer edge, can be moved behind the back of the settee, with its top face toward said back. The seat is provided with slotted bars at its ends, which co-operate with hinged braces, furnished with pins, which engage with the slotted bars, for the purpose of retaining the seat in its horizontal position, and to facilitate the operation of folding the seat. With the desk and the folding seat are combined book and slate racks, to increase the facilities of the article.

In the drawing, the letter A designates the two side pieces of my combined settee and desk. These side pieces are, by preference, made of cast-iron, each cast in a single piece, and they are provided with flanged bases *a* at their lower ends for the reception of screws, which serve to secure the article firmly in position on the floor. Between the side pieces is firmly secured the back B, which is, by preference, made of wood, and provided with a top rail, *b*, having a recess or opening, *c*, in it to receive the inkstand. Behind the back B are situated an oblong box, C, which serves as a book-rack, and a narrow box, D, which serves as a slate-rack, both racks being firmly secured between the side pieces A A. The letter E designates the desk, which is, by preference, made of wood, so as to form a smooth plane surface. This desk is not rigidly attached to the side pieces A A; but it is so arranged that the same, when not used, can be moved behind the back of the settee, with its top face toward said back, and that this motion can be imparted to it without disturbing the scholars sitting on the settee in front or behind said desk. If the desk is connected to the side pieces by a simple hinge-joint at its inner edge, and provided with braces to retain it in position when it is turned up, it can be folded down behind the back of the settee, but in order to accomplish this operation the scholars occupying the seat behind said desk are obliged to leave their seat; but by arranging the desk so that it can be brought behind the back of the settee by raising its outer edge, neither the scholars behind nor those in front will be disturbed. In order to accomplish this object I secure on the ends of the desk two metal strips, *a**, which are provided with gudgeons *d d* to fit in recesses *e* in the inner surfaces of the side pieces A A, while on the rear sides of said recesses are formed shoulders *e**, which are slightly inclined from a horizontal position, so that when the desk is turned down to the position shown in Fig. 2, it will be retained by said shoulders in the required position, while the gudgeons *d d* bear against the upper ends of the recesses *e*. Thus it will be seen that the bearings on the side pieces of the settee serve to support the desk when the same is in position for use at points intermediate between its back and front edges. The recesses are oblong, so that by raising the outer edge of the desk its rear edge moves down behind the back of the settee, and the desk can be brought in such a position that its face is turned toward each back. When the outer edge of the desk is raised said desk turns on the shoulders *e** as the bearings, while the inner edge is depressed, and when the desk has been brought to a vertical, or nearly vertical, position, it slides on the bearings *e**, being guided by the gudgeons *d d* and recesses *e*. The seat F is constructed of wood, and to its side edges are secured bars or strips *f*, made of metal, and each provided with a slot, *g*, to receive pins *h* which project from the upper ends of braces or supports G G, the lower ends of which are attached to the side pieces A A by pivots *h**, while the bars or strips *f* are provided with gudgeons *g**, which catch in suitable cavities in the side pieces A A.

By this arrangement it will be seen that the seat F may, when not required for use, be raised up out of the way, (see Fig. 1,) or turned down when required for use, as shown in Fig. 2.

The device is extremely simple and efficient, it can be economically constructed, and it is strong and durable, there being no parts liable to get out of repair or become deranged by use.

What I claim as new, and desire to secure by Letters Patent, is—

1. The combination, with a school-settee and a swinging desk, of bearings on the side pieces of the settee, said bearings serving to support the desk when the same is in position for use at points intermediate between its back and front edges, substantially as described, whereby, when the front or outer edge of said desk is raised, its top face is turned toward the back of the settee.

2. The sliding desk E, provided with gudgeons *d d*, projecting from its ends and catching in guide-grooves in the side pieces A A of a settee, substantially as set forth.

3. The pivoted seat F, provided with slotted bars or strips *f* at its ends, in combination with the pivoted supports G G, having pins *h*, to work in the slots of the bars or strips *f*, substantially as shown and described.

4. The arrangement of book and slate racks C D between the side pieces A A of a school-settee, substantially as and for the purpose set forth.

In testimony that I claim the foregoing I have hereunto set my hand and seal this 7th day of April, 1875.

JOHN PEARD. [L. S.]

Witnesses:

W. HAUFF,

E. F. KASTENHUBER.